United States Patent
Stein

(10) Patent No.: US 11,305,688 B2
(45) Date of Patent: Apr. 19, 2022

(54) METHOD FOR VISUALIZING A CROSSING OVER A ROAD

(71) Applicant: DAIMLER AG, Stuttgart (DE)

(72) Inventor: Fridtjof Stein, Ostfildern (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 17/285,236

(22) PCT Filed: Oct. 9, 2019

(86) PCT No.: PCT/EP2019/077411
§ 371 (c)(1),
(2) Date: Apr. 14, 2021

(87) PCT Pub. No.: WO2020/078810
PCT Pub. Date: Apr. 23, 2020

(65) Prior Publication Data
US 2021/0370823 A1    Dec. 2, 2021

(30) Foreign Application Priority Data
Oct. 17, 2018 (DE) ...................... 10 2018 008 213.0

(51) Int. Cl.
*B60Q 1/50* (2006.01)
*H04W 4/46* (2018.01)
(Continued)

(52) U.S. Cl.
CPC ............ *B60Q 1/50* (2013.01); *G06V 20/588* (2022.01); *G08G 1/09* (2013.01); *H04W 4/46* (2018.02); *B60Q 2400/50* (2013.01)

(58) Field of Classification Search
None
See application file for complete search history.

(56) References Cited

U.S. PATENT DOCUMENTS 10,065,555 B2 * 9/2018 Abrams ............... B60Q 1/0023
10,134,280 B1 * 11/2018 You ........................ G08G 1/162
(Continued)

FOREIGN PATENT DOCUMENTS

DE    102013217057 A1    3/2014
DE    102012024494 A1    6/2014
(Continued)

OTHER PUBLICATIONS

International Search Report dated Jan. 20, 2020 in related/corresponding International Application No. PCT/EP2019/077411.
(Continued)

*Primary Examiner* — Muhammad Adnan
(74) *Attorney, Agent, or Firm* — Patent Portfolio Builders PLLC

(57) ABSTRACT

A method for visualizing a crossing over a road for a road user wanting to cross the road. At least one vehicle driving on the road stops and projects an image pattern onto the road for the road user crossing the road. The vehicle projecting the image pattern communicates with another vehicle driving on the road. The first vehicle projecting the image pattern on a first lane informs the other vehicle in at least one further lane at least indirectly about the road user wanting to cross the road and the image pattern which is projected or still to be projected, and it requests the other vehicle to stop and for its part to project an image pattern onto its lane in addition to the image pattern of the first vehicle or at least indirectly reports back to the first vehicle that it should also take over the projection on its lane.

8 Claims, 5 Drawing Sheets

Figure 1:
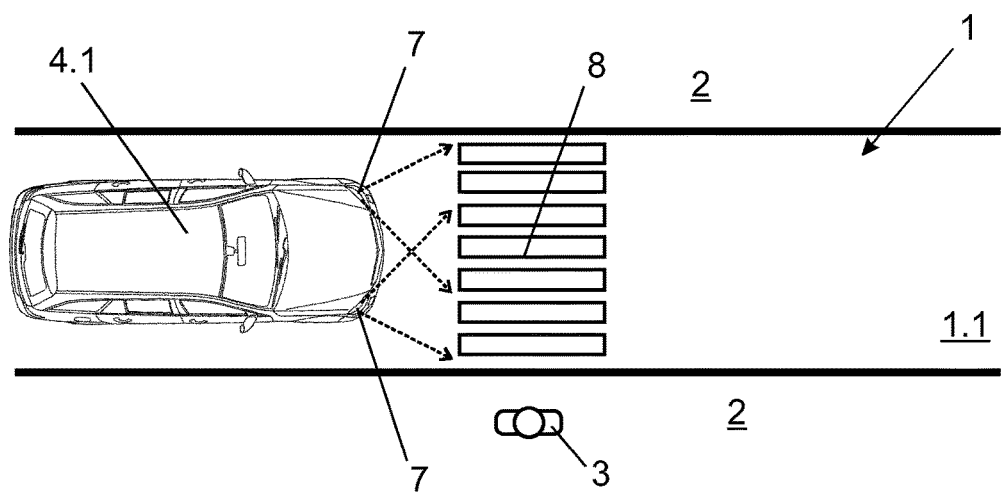

(51) Int. Cl.
*G08G 1/09* (2006.01)
*G06V 20/56* (2022.01)

(56) References Cited

U.S. PATENT DOCUMENTS

| | | | |
|---|---|---|---|
| 10,160,378 B2* | 12/2018 | Sweeney | B60Q 5/005 |
| 10,217,361 B2* | 2/2019 | Jung | B60Q 1/525 |
| 10,885,772 B2* | 1/2021 | Camras | B60Q 1/525 |
| 2007/0102214 A1* | 5/2007 | Wittorf | B60Q 1/50 |
| | | | 180/167 |
| 2014/0267398 A1* | 9/2014 | Beckwith | G06T 19/006 |
| | | | 345/633 |
| 2014/0324286 A1* | 10/2014 | Tsuchida | B60W 50/00 |
| | | | 701/36 |
| 2015/0228195 A1* | 8/2015 | Beaurepaire | G08G 1/0962 |
| | | | 340/907 |
| 2015/0336502 A1* | 11/2015 | Hillis | B60Q 1/26 |
| | | | 701/23 |
| 2018/0261081 A1* | 9/2018 | Suzuki | B60Q 9/008 |
| 2020/0114813 A1* | 4/2020 | Lujan | B60Q 1/525 |
| 2020/0198534 A1* | 6/2020 | Ito | G08G 1/163 |
| 2021/0065538 A1* | 3/2021 | Tamura | B60Q 5/005 |

FOREIGN PATENT DOCUMENTS

| | | |
|---|---|---|
| DE | 102012223410 A1 | 6/2014 |
| DE | 102014226254 A1 | 6/2016 |
| DE | 102016000555 A1 | 7/2016 |
| DE | 202017103902 U1 | 7/2017 |
| DE | 102016007014 A1 | 12/2017 |
| DE | 102016122686 A1 | 5/2018 |
| DE | 102017103862 A1 * | 8/2018 |
| DE | 102017103862 A1 | 8/2018 |
| DE | 102017205626 A1 | 10/2018 |
| EP | 3217377 A1 | 9/2017 |
| JP | 2008009941 A * | 1/2008 |

OTHER PUBLICATIONS

Office Action created on Jan. 25, 2019 in related/corresponding DE Application No. 10 2018 008 213.0.

Written Opinion dated Jan. 20, 2020 in related/corresponding International Application No. PCT/EP2019/077411.

* cited by examiner

METHOD FOR VISUALIZING A CROSSING OVER A ROAD

BACKGROUND AND SUMMARY OF THE INVENTION

Exemplary embodiments of the invention relate to a method for visualizing a crossing over a road.

In 2015, a generic method was presented in a research vehicle of the applicant. The autonomous vehicle is able to recognize a road user, such as in particular a pedestrian, together with his/her intention that he/she wants to cross a road. In order to indicate to the road user that he/she has been detected on the one hand and that he/she can safely cross the road on the other hand, since the vehicle will stop, an image pattern in the form of a zebra crossing is projected onto the road in front of the vehicle, such that the road user can safely cross the road on the projected zebra crossing.

As long as the vehicle on the road is the only vehicle, this works very reliably. However, if other vehicles are also on the road, in particular in other lanes of the road, the method reaches its limits. In particular, no guarantee can be provided for the safety of crossing adjacent lanes of the road, despite the superimposed zebra crossing.

Other approaches therefore focus on preventing the crossing of the road altogether when an (autonomous) vehicle is approaching. In DE 10 2016 007 014 A1, for example, a stop sign is projected onto the road, which means that the aforementioned problem does not arise in this way.

In addition to this document, other concepts since the conception of the basic concept by the applicant also use a targeted illumination or projection of image patterns, which can also (co-)comprise pictograms and/or characters etc. For this purpose, reference can be made, for example, to DE 20 2017 103 902 U1. Pixel headlights and/or laser headlights are used for projection, which is known from the general prior art.

In particular from the field of autonomous vehicles, but not only from such, it is known that direct or indirect communication can also take place between vehicles, via which the vehicles inform each other about detected environment data and detected traffic information. This is also referred to as vehicle-to-vehicle or Car2Car communication. A communications center or any other point (X) can also be interposed such that communication between the vehicles takes place indirectly as vehicle-to-X and then as X-to-vehicle or as Car2X and X2Car. In this context, reference can be made, for example, to DE 10 2016 000 555 A1 or also DE 10 2016 122 686 A1.

DE 10 2017 205 626 A1 describes a method for operating a lighting device for a motor vehicle, in which a headlight of the motor vehicle projects a symbol onto a surface. It can thereby project the symbol for a pedestrian and communicate with other vehicles via it.

DE 10 2014 226 254 A1 shows a method for operating a signaling device of a motor vehicle, in particular an autonomously or semi-autonomously driving/driveable motor vehicle, which has at least one signaling means that can be perceived from outside the motor vehicle by other road users. It is provided that, depending on a detected road user, the signaling device is actuated in order to display to the detected road user information about a further behavior of the motor vehicle.

With respect to further prior art, reference can further be made to DE 10 2012 223 410 A1 and to DE 10 2012 024 494 A1.

Exemplary embodiments of the present invention are directed to an optimized method for visualizing a crossing over a road, which enables improved safety for a comfortable crossing of the road.

The method according to the invention visualizes, comparable to the prior art created by the applicant which is explained in the introduction, a safe crossing for a road user wanting to cross a road. This can be a pedestrian, but also a cyclist or similar. In particular, he/she is not in a closed vehicle and is not obliged to use a road.

A vehicle, for example an autonomous vehicle, lets the road user, for example the pedestrian, cross the road. It informs him/her of this by projecting a corresponding image pattern, for example the zebra crossing as in the prior art mentioned in the introduction, onto the road. Laser lights or pixel lights based on individual light points or light points emitted into the environment via micromirrors can be used for this purpose, for example. At the same time, the first vehicle projecting the image pattern establishes communication with any other vehicles which may be in the vicinity, in particular those in other lanes, and informs them that a road user, such as a pedestrian, wants to cross the road. It also informs the other vehicles about the projected or yet-to-be-projected image pattern. This informs the vehicles driving in the vicinity, in particular in parallel lanes in the same or opposite direction, regardless of whether they are autonomously or manually controlled, about the situation. The first vehicle projecting the image pattern requests the at least one other vehicle or the other vehicles to stop in turn and project an image pattern in addition to the image pattern of the first vehicle, or if they are unable to do so, to report back to the first vehicle that it will take over the projection in the lane of the vehicle which is itself unable to project the image pattern. Such cooperation between the vehicles, starting from the first vehicle, thus creates a situation in which all the vehicles involved participate in allowing the road user who wants to cross the road to do so. The vehicles all participate, if possible, via the projection of an image pattern, in indicating this to the road user accordingly and thus enabling him/her to cross all lanes of the road safely.

The method further provides that the image pattern comprises at least two graphically different and/or differently colored states, one of which signifies that the entire road can be safely crossed, and another of which signifies that only the lane on which the image pattern is projected can be safely crossed. The image pattern, for example a zebra crossing, is thus coded, for example graphically by an adaptation of the outlines, a flashing of the pattern or similar, and/or by color, for example by the known type of a traffic light representation, such that the road user knows or can recognize from the coding whether the crossing is safe. By way of example, a yellow zebra crossing can signify that only the lane on which the zebra crossing is projected can be safely crossed, and that another lane is currently not yet safe. If other vehicles have been involved and have stopped, for example, a green zebra crossing can be projected continuously across several lanes to indicate to the road user that he/she can safely cross all lanes of the entire road.

In doing so, the first vehicle monitors the implementation of its request to the at least one other vehicle via feedback communication and/or its environment sensor system. It adjusts the state of the image pattern after the request has been complied with or if it can be predicted that the request will be complied with.

According to a very advantageous development of the invention, it is provided that the communication is carried out via optical signals of the first vehicle. The first vehicle can initiate the communication purely via optical signals such as, for example, a flashing or a specific image pattern, in particular in the region of the lane of the vehicle with which it wishes to communicate. The corresponding optical signals, such as the pattern, the actuation of a hazard warning light or similar, are recognized accordingly by the further vehicle or its environment sensor system and thus enable the further vehicle to react accordingly in the manner desired by the first vehicle. This works both in the case of autonomously driving vehicles, in which the environment sensor system detects the optical signals accordingly and evaluates them with regard to their coding, and in the case of a partially or completely manually operated vehicle, in which an attentive driver, possibly supported by an assistance system, then detects the signals and acts accordingly.

Such communication via optical signals does not require a direct connection between the vehicles and is therefore particularly simple and also very secure with regard to potential unauthorized access to the vehicle. However, in the case of autonomous or semi-autonomous vehicles, this type of communication requires appropriate evaluation of the data in order to correctly assess the situation by means of the environment sensor system and/or to give the correct instructions to the person driving the vehicle within the scope of an assistance system.

According to a further very advantageous embodiment, it can therefore also be additionally or alternatively provided that the communication is a vehicle-to-vehicle communication, or takes place as indirect communication via a communication center or similar, i.e., as vehicle-to-X and X-to-vehicle communication, and is thus designed as indirect communication between the vehicles. Such communication offers the advantage that very detailed information can be transmitted in a very targeted manner if the vehicles have the same communication protocol. The communication can be implemented in a manner known in itself, for example via a radio link or similar.

In order to avoid unnecessary load on the communication channels, it can be provided according to an advantageous development of the invention that, after the road has been crossed by the road user, the communication link is terminated again starting from the first vehicle, which initiated the communication and plays a central role in the whole process, in order to quickly enable the communication channels again for other communications.

As already mentioned, the first vehicle that has detected the pedestrian or the other road user and his/her desire to cross the road plays a special role in this process. It initiates the communication with the other vehicles, regardless of the communication channels, and can also help monitor them to a certain extent. Ultimately, therefore, communication is set up in the manner of a master-slave system, in which the first vehicle acts as the master and the other vehicle or vehicles involved act as slaves, depending on this.

An advantageous development of the idea further provides that the image pattern comprises a graphical representation of a blocked area that is not to be entered. Such a representation can be, for example, an X, which indicates by its coloring, for example red, and/or graphic representation, for example a flashing, that this area is blocked. On the one hand, this can indicate to the road user that he/she should not step into the adjacent lane, for example, and on the other hand, it can serve to communicate with a vehicle travelling in this adjacent lane. The driver of the vehicle or its environment sensor system perceives the X located in its lane next to the stationary or already greatly slowed vehicle and thus recognizes the situation, namely that a road user wants to cross the road here. The vehicle can stop accordingly and communicate this back to the first vehicle, or the first vehicle can also recognize or detect this automatically via its environment sensor system. In such a situation, the vehicles can then jointly project an image pattern in the form of a zebra crossing, for example, in order to enable the safe crossing of the road in the case of two lanes or at least as far as a traffic island located in the middle of the road. The red X as an example of a graphic sign of a blocked zone can then be hidden again if, for example, the second vehicle has projected the zebra crossing or at least stopped in order to request the first vehicle to also project the zebra crossing in its lane. In this situation, unless the road has more than the two lanes addressed, the crossing would then be safe across the entire road, such that the zebra crossing can be coded accordingly and displayed across the entire width of the road, for example, in green. In the case of more lanes and more vehicles involved, this substantially works analogously.

In addition to color coding, corresponding symbols or pictogram, the projection of text or similar are, of course, also possible. This can be done both statically and by flashing or, in the case of text, in the manner of scrolling text.

Further advantageous embodiments of the method according to the invention further arise from the remaining dependent sub-claims and become clear on the basis of the exemplary embodiments, which are described in more detail below with reference to the figures.

Figure 2:
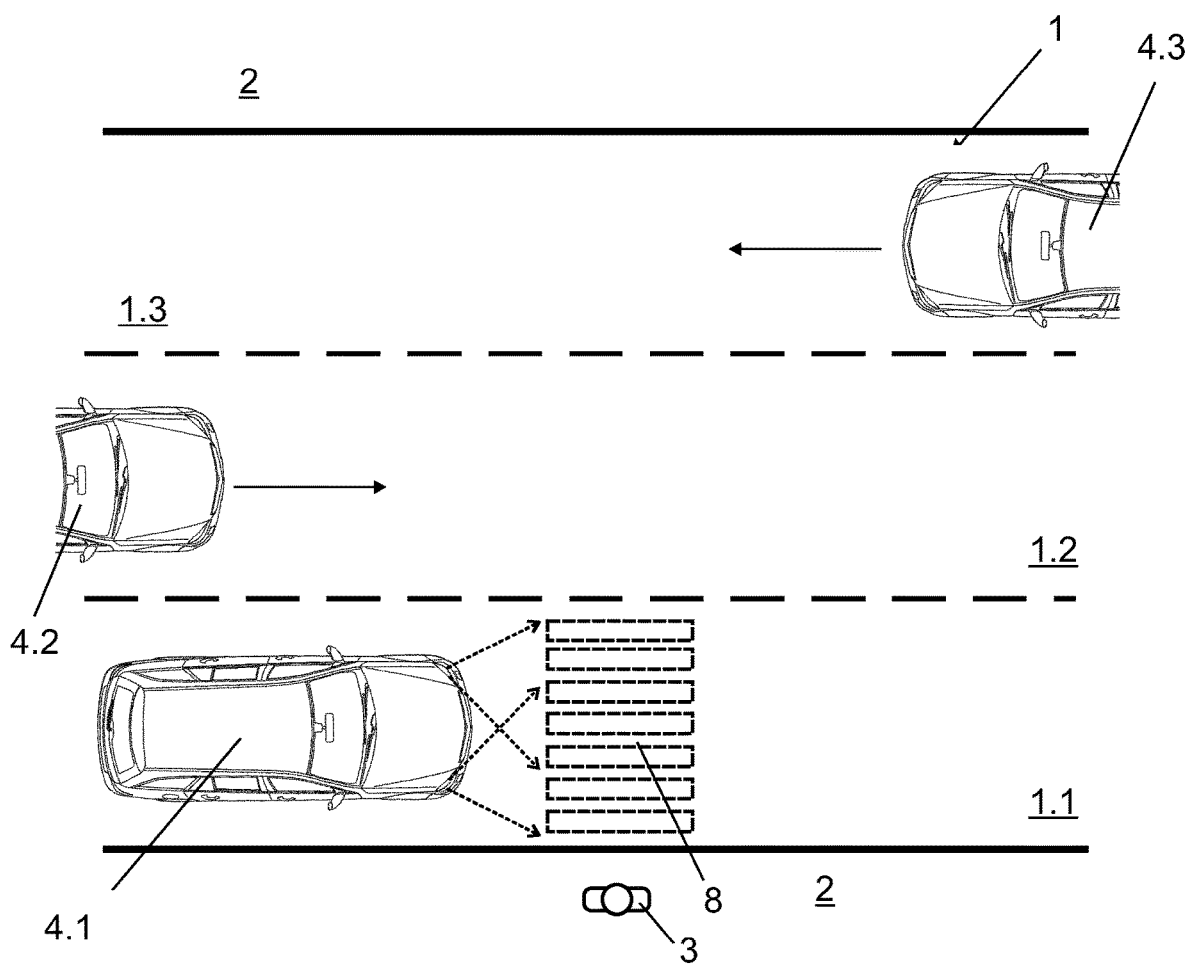
Figure 3:
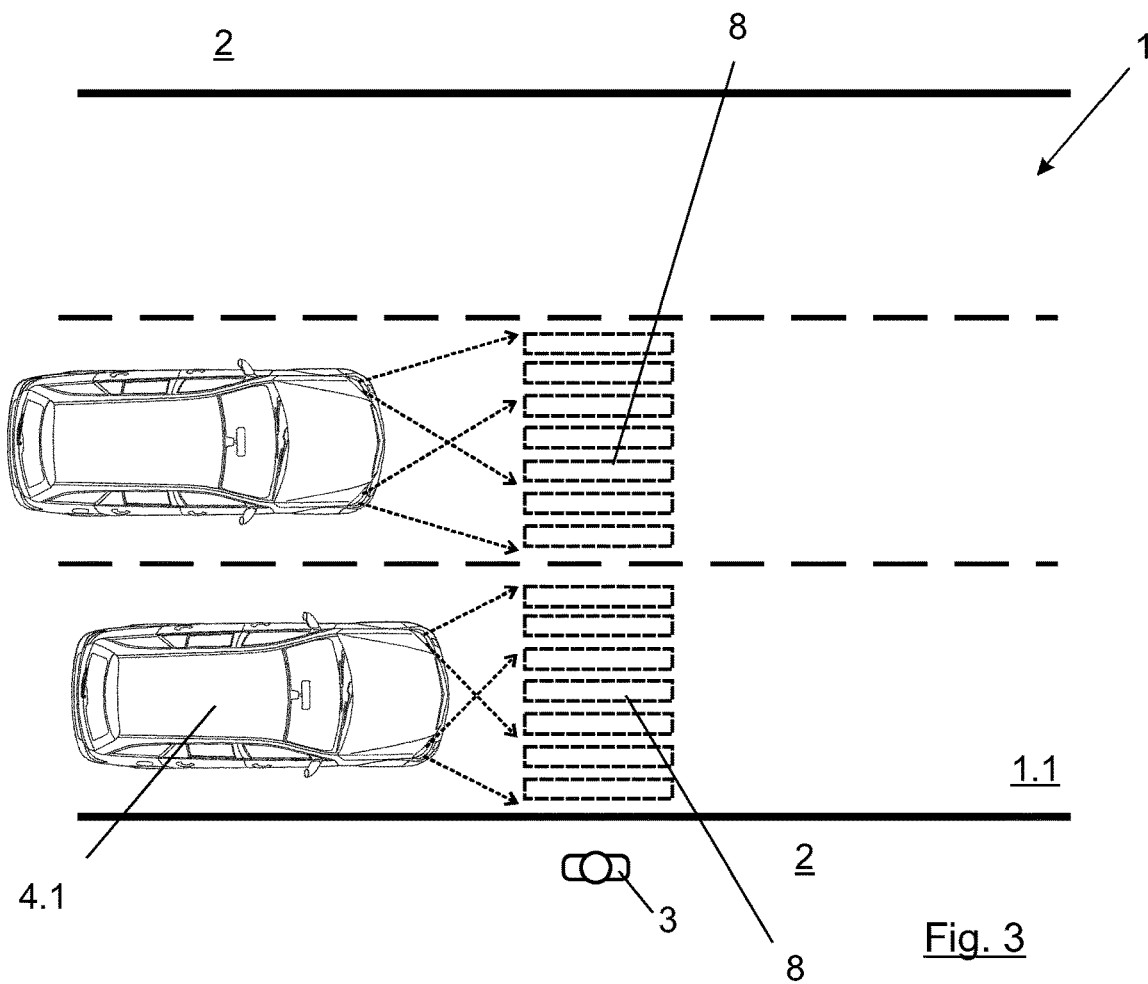
Figure 5:
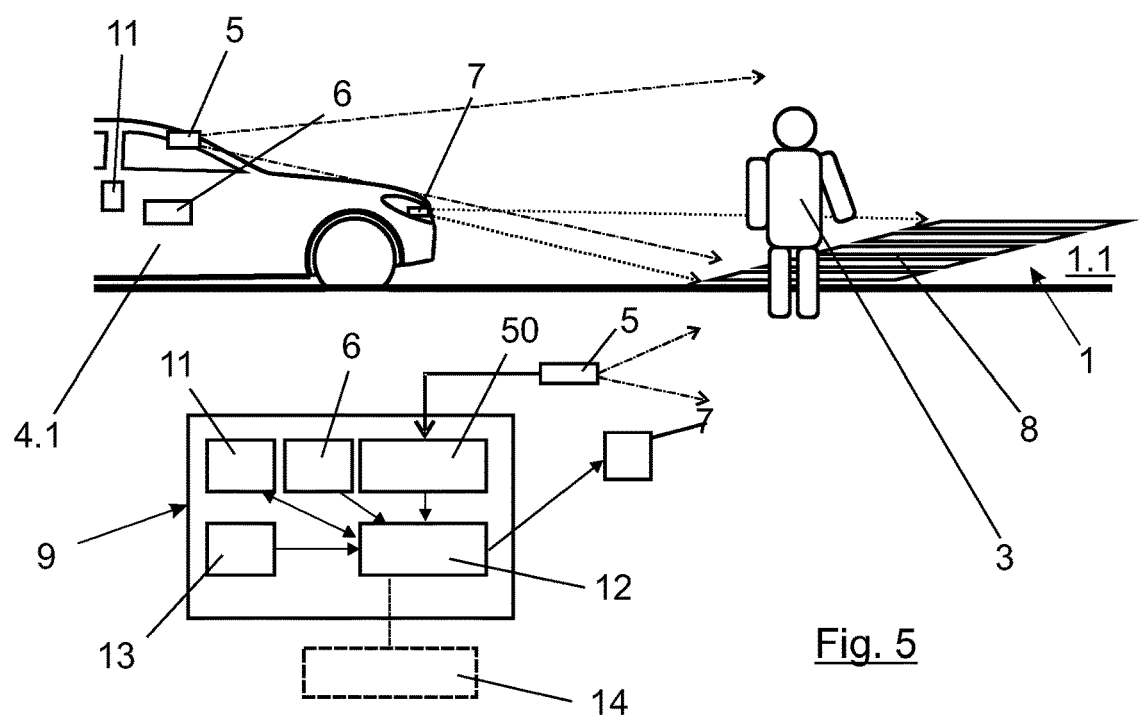
Figure 4:
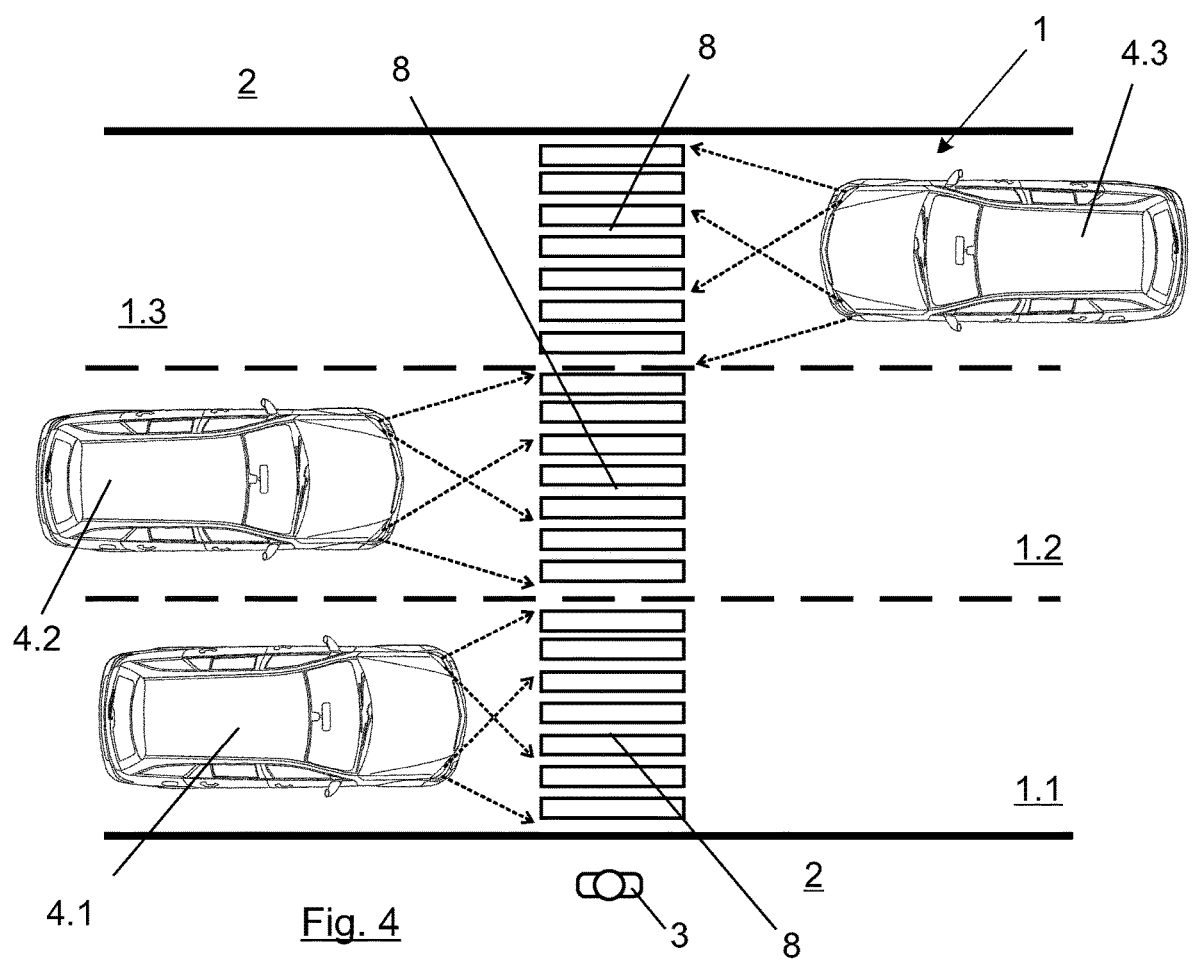
Figure 6:
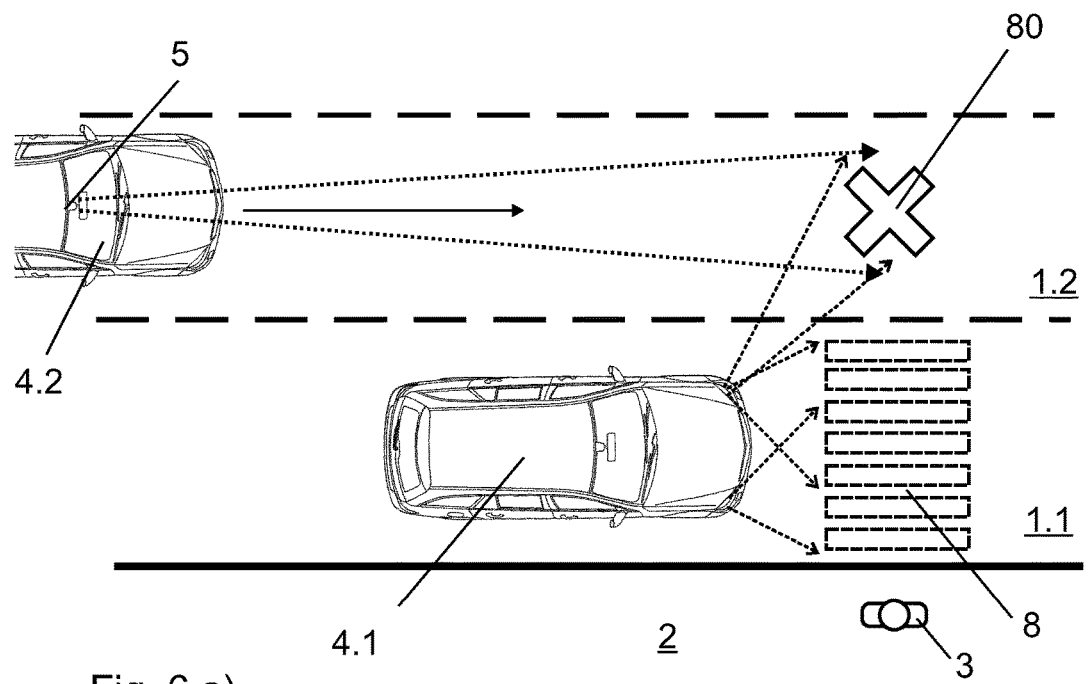
Figure 6:
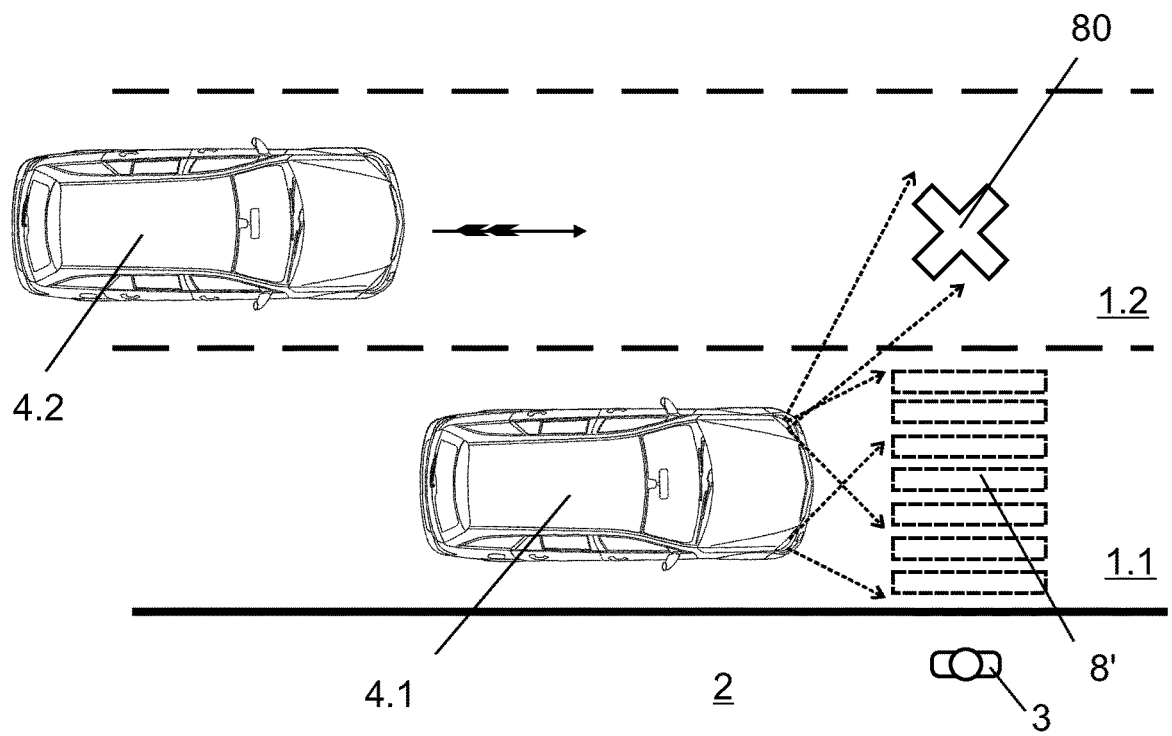
Figure 6:
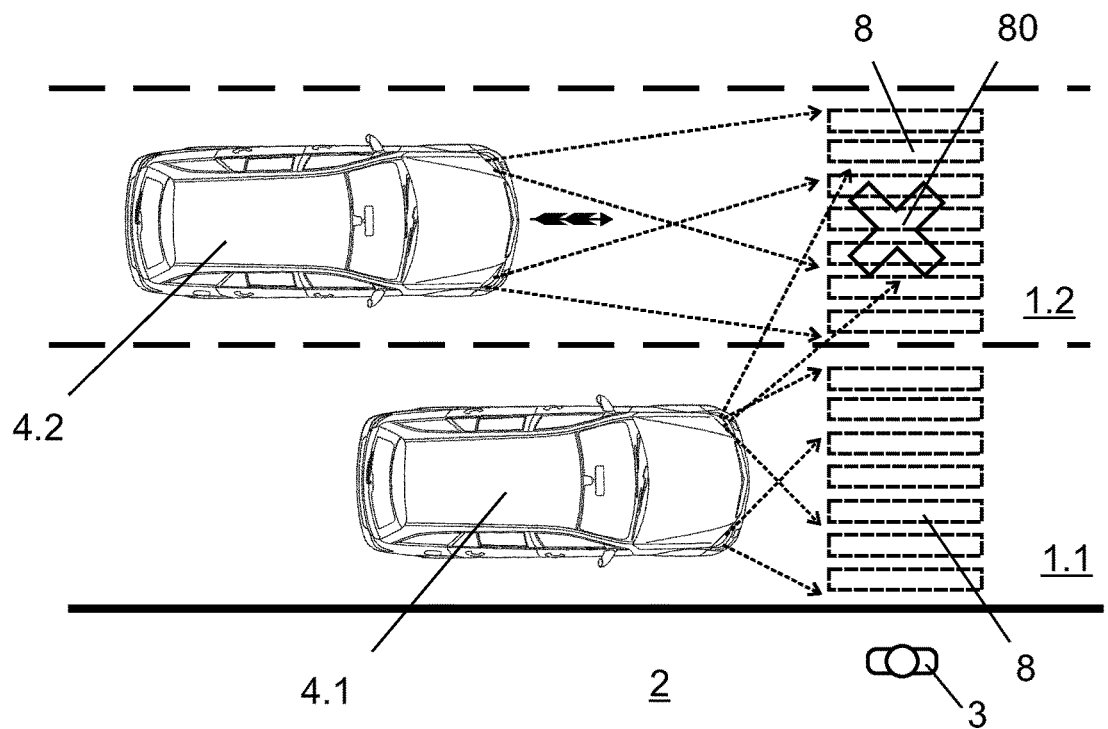
Figure 6:
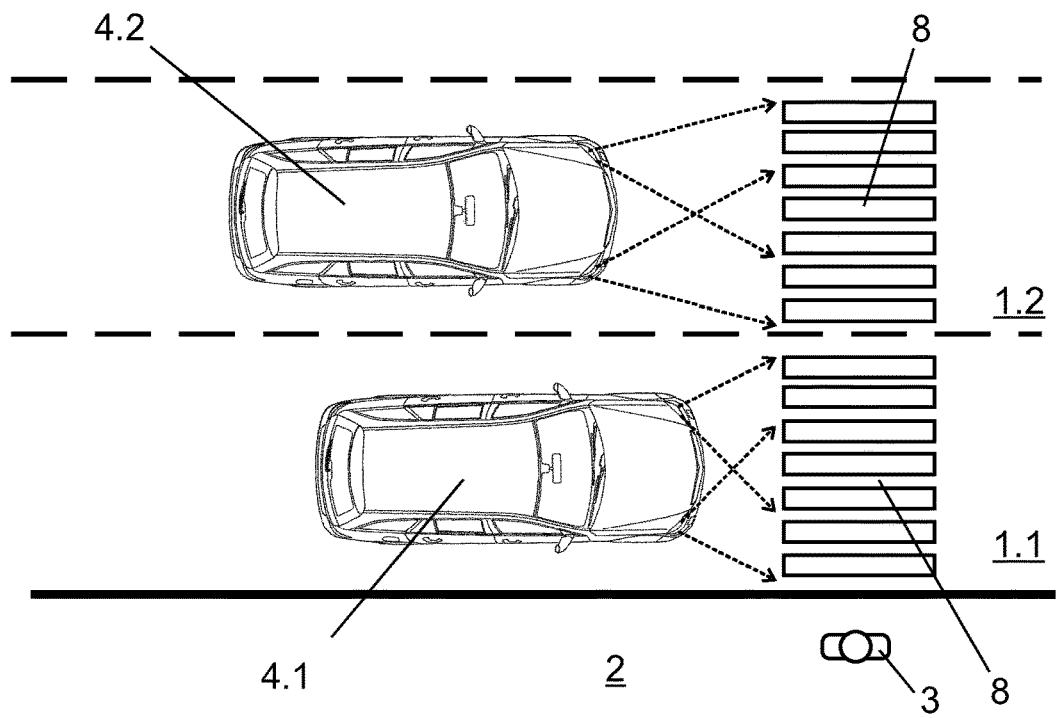
Figure 7:
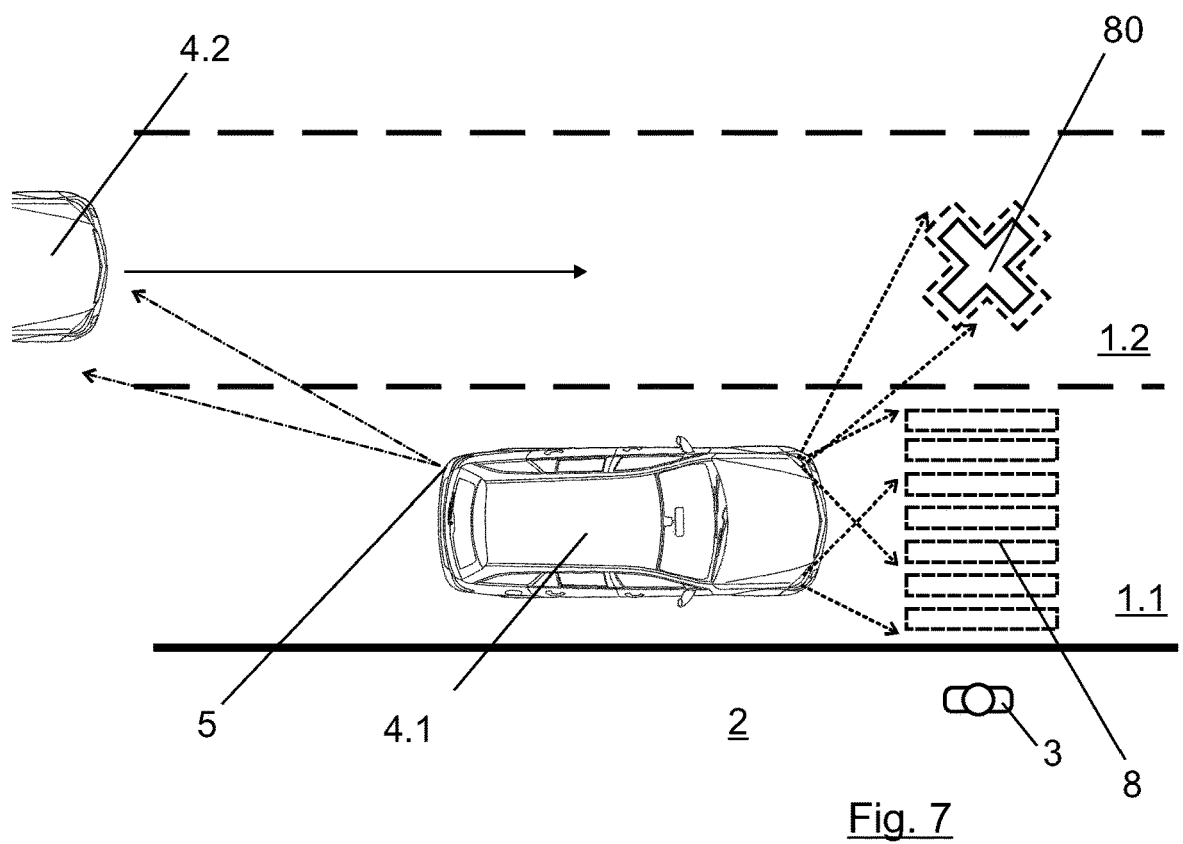

Here are shown:

FIG. 1 a scenario from a bird's eye view to illustrate the method according to the invention;

FIG. 2 further scenario from a bird's eye view to illustrate the method according to the invention;

FIG. 3 the scenario according to FIG. 2 with an involved vehicle;

FIG. 4 the scenario according to FIG. 2 with two involved vehicles;

FIG. 5 a schematic depiction of the technical equipment required at least in the first vehicle to implement the method according to the invention;

FIGS. 6a)-6d) various scenarios in chronological sequence to one another and a development of the method according to the invention with an additional projection of a blocked area which is not to be entered; and FIG. 7 a further scenario illustrating an additional further use of the additional projection of the blocked area which is not to be entered.

DETAILED DESCRIPTION

In the depiction of FIG. 1, a first scenario from a bird's eye view can be seen. In the exemplary embodiment depicted here, a road 1 has a single lane 1.1 and is delimited on both sides in each case by a pavement designated with 2, wherein a pavement is understood to mean any area on which, for example, a pedestrian 3, depicted here as a road user wishing to cross the road 1, is safe, i.e., also, for example, a traffic island between the lanes or similar. A vehicle 4.1, which has an environment sensor 5 (not explicitly depicted here), approaches on the road 1 and detects, using the environment sensor 5, a situation according to which the pedestrian 3 as a road user wants to cross the road 1 with the one lane 1.1. The vehicle 4.1 now recognizes, using its environment sensor system 5 and/or a map module 6, for example in a navigation device of the vehicle 4.1, that the road 1 only has the one lane 1.1. The vehicle 1 can therefore enable the pedestrian 3 alone to cross the road 1 with its one lane 1.1 safely. To do this, it reduces its speed and stops. It projects an image pattern 8 in the form of a zebra crossing onto the road 1 or the lane 1.1 of the road 1 via pixel headlights, laser headlights, or a laser projection 7. If the pedestrian 3 can cross the lane 1.1 safely, the image pattern 8, in this case, for example the zebra crossing, has a certain coding. This can be, for example, as coding for "crossing a lane safely" the color yellow, which is symbolized in the figures by a dashed representation of the image pattern 8. The vehicle 4.1 or its environment sensor 5 and/or the map module 6 enable here the further information that the lane 1.1 corresponds to the entire road 1, because the road 1 here just has this lane 1.1. In this case, the coding of the image pattern 8 can also be done in such a way that it is indicated that the pedestrian 3 can safely cross the entire road 1. In this case, the zebra crossing of the image pattern 8 could, for example, be projected onto the road in green color symbolized by a solid representation in order to, in accordance with the mode "the entire road can be crossed safely", indicate this to the pedestrian 3.

The scenario described is relatively simple, since the vehicle 4.1, which is also referred to below as the first vehicle, can detect the situation on its own and decide about the safety of the crossing on its own. However, if the road 1 now has several lanes, as is indicated in the depiction of FIG. 2, the situation becomes correspondingly more difficult. The vehicle 4.1 is the first vehicle on the lane 1.1. Another lane runs adjacently to it in the same direction of travel. It is marked 1.2 and is to be used by a vehicle marked 4.2. Another lane 1.3 runs in the opposite direction. A third vehicle marked 4.3 is also travelling in this lane. The first vehicle 4.1 now recognizes the will of the pedestrian 3 to cross the road, comparable to the depiction according to FIG. 1. It stops accordingly and projects a zebra crossing as an image pattern 8. The first vehicle 4.1 can only ensure safe crossing for the lane 1.1 of the road 1 that it is travelling in. Accordingly, the image pattern 8, in this case the zebra crossing, is shown in a color code, for example in yellow, which indicates this to the pedestrian 3 accordingly. The pedestrian can therefore only safely cross the lane 1.1 at the current time. There is a threat of danger in extending the image pattern 8 on the other lanes 1.2 and 1.3.

As the "master", the first vehicle 4.1 now establishes communication with the further vehicles 4.2 and 4.3 and informs them about the situation, which is of particular interest in the case of the vehicle 4.2, in that there is a risk that both the projected image pattern 8 and the pedestrian 3 are so obscured by the vehicle 4.1 that a person driving the vehicle 4.2 or its environment sensor system 5 cannot perceive this accordingly. By means of the communication between the vehicle 4.1 and the vehicle 4.2, for example via a radio communication can be implemented, which is also referred to as vehicle-to-vehicle or Car2Car communication. Via such a Car2Car communication, the vehicle 4.1 can request the vehicle 4.2 to reduce its speed accordingly, to stop and also to project an image pattern 8 in the form of a zebra crossing. This situation is shown accordingly in the depiction of FIG. 3. Since the lane 1.3 of the road 1 cannot (yet) be crossed safely, the zebra crossing is represented in both cases as image pattern 8 with the coding "one lane safe", for example in the color yellow.

The first vehicle 4.1 will now also make contact with the vehicle 4.3 in the lane 1.3 of the road. Here too, the first vehicle 4.1 informs the vehicle 4.3 accordingly. Furthermore, the first vehicle 4.1 requests the third vehicle 4.3 to also stop and in turn project a zebra crossing as image pattern 8. The depiction in FIG. 4 shows the complete process in which all three vehicles 4.1, 4.2, 4.3 have stopped or are decelerating sharply in order to stop. In this situation, all three project the corresponding image pattern 8 of the zebra crossing. Since the entire road 1 having all three lanes 1.1, 1.2 and 1.3 is now safe to cross, this projection occurs with the coding "road safe to cross", for example in green color. The pedestrian 3 now knows that he/she can safely cross the entire road 1 and will do so.

As soon as he/she has crossed the road, this can in turn be recognized accordingly by the first vehicle 4.1, which here acts as the master. It then breaks off communication with the other vehicles 4.2 and 4.3 acting as slaves, such that after the "situation" has been resolved, no further communication takes place between the vehicles 4.1, 4.2, 4.3, and the corresponding communication channels are enabled again for other communications.

The depiction in FIG. 5 shows once again, as already mentioned, the structure of an exemplary vehicle, for example the first vehicle 4.1. As shown above in the schematic depiction of the vehicle 4.1 and below in the schematically indicated control unit 9, the vehicle 4.1 has a map module 6, a communication module 11, which is designed as a Car2X or Car2Car module. Furthermore, an environment detection is provided, for example with cameras, radar, lidar, or similar. The environment detection is indicated in the depiction of FIG. 5 via a camera and is provided with the reference numeral 5. Accordingly, in the control unit there is an environment detection and fusion module 50, which, in the case of several sensors for environment detection, fuses these accordingly and evaluates the results obtained. The vehicle 4.1 itself also has a projection unit, which is implemented, for example, by the pixel headlights or the laser projection 7. It is controlled accordingly by a cooperative control module 12 of the control unit 9. The cooperative control module 12 for the crossing of the road 1 by a pedestrian is in operative connection with the other modules accordingly and further has access to a situation analysis and planning module 13, via which the corresponding situation that the pedestrian 3 wants to cross the road 1 is detected and the corresponding reaction of the vehicle 1 to this is planned. The cooperative control module 12 can optionally, in the case of non-autonomous vehicles, have a display module 14, via which a driver of a non-autonomous vehicle is prompted to act cooperatively accordingly, for example based on a Car2Car communication or a communication via detected optical signals of another vehicle, in order to ensure the safe functionality of the crossing of the road 1 for the pedestrian 3 even in such a situation with at least one non-autonomous vehicle.

The first vehicle 4.1 detects the will of the pedestrian 3 and initiates the pedestrian crossing. In doing so, it operates in a master mode, while the other vehicles 4.2, 4.3 are requested by the first vehicle 4.1 to cooperate and accordingly operate in a slave mode.

As already described, the vehicle 4.1 has detected a situation in which the pedestrian 3 wants to cross the road 1. The first vehicle 4.1 supports this based on its situation analysis by stopping, as already mentioned above, and displaying the image pattern 8 as a zebra crossing, in the case of road 1 with several lanes 1.1, 1.2, 1.3 with the coding "one lane safe" directly in front of the pedestrian 3 on the road, as indicated in FIGS. 1, 2 and 5. Via a communication, for example a direct or indirect Car2Car communication, the other vehicles 4.2 and 4.3 in the vicinity are now made aware of the situation and requested to act cooperatively.

The vehicles 4.2 and 4.3 are in slave mode during this process. By way of example, the vehicle 4.2 has detected, either via its ambient detection and corresponding optical signals from vehicle 4.1 or a Car2Car communication, that along the planned route of travel in the example of the previous figures in lane 1.2, a pedestrian crossing initiated by the first vehicle 4.1 is planned. According to the distance to this pedestrian crossing initiated by the first vehicle 4.1, the inherent speed of the second vehicle 4.2 is reduced and, after the location of the projection has been detected, the corresponding connection projection on the lane 1.2 is triggered, as is depicted accordingly in FIG. 3. In this situation, the first vehicle 4.1 is the master and the second vehicle 4.2, which was then added, is the slave. The situation is now supplemented by the third vehicle 4.3 in the lane 1.3, which reacts in the same way as the vehicle 4.2 and also operates in the slave mode. As soon as all lanes 1.1, 1.2 and 1.3 of the road 1 are appropriately secured, all participating vehicles 4.1, 4.2 and 4.3 switch their projection from "one lane safe" to "road safe", such that the pedestrian 3 knows that he/she can now safely cross the entire road with all its lanes 1.1, 1.2, 1.3.

The request from the first vehicle 4.1 to the vehicles 4.2 and 4.3 to switch the state of the image pattern 8 from "one lane safe" to "road safe", i.e., to change the color from yellow to green, as described in the exemplary embodiment depicted here, can again be made via the Car2Car communication, or also by an environment sensor system of the other vehicles 4.2 and 4.3 or the fact that a person driving these vehicles has detected that the first vehicle 4.1 has switched its part of the zebra crossing as an image pattern to green. As mentioned, this can be detected by the person or the environment sensor system and serve as a request to also switch the state of the zebra crossing from yellow to green.

In the depiction of FIGS. 6*a*)-6*d*), a further embodiment of the method according to the invention is now shown on the basis of four individual images a) to d) to be understood in chronological sequence. The situation shows a part of the road 1 with the lanes 1.1 and 1.2, the pavement 2, as well as the pedestrian 3. The first vehicle 4.1 has already stopped comparably as in the embodiments described above and projects the image pattern 8 in the form of the zebra crossing, for example in the coding variant "one lane safe", i.e., for example in yellow and accordingly represented dashed, onto the lane 1.1. A second vehicle 4.2 approaches the first vehicle 4.1 from behind, such that the pedestrian 3 and the projected image pattern 8 in the form of the crosswalk in the coding for "one lane safe" cannot be detected by a driver or the environment sensor system of the second vehicle 4.2. The first vehicle 4.1 has therefore projected an additional projection of the image pattern 8, in this case an X designated 80, which on the one hand indicates to the pedestrian 3 that the area of the second lane 1.2 of the roadway 1 is not safe to enter, and which at the same time visually symbolizes the situation to a driver or the environment sensor system 5 of the second vehicle 4.2. Through this type of optical communication, the vehicle 4.2 can now also be requested by corresponding coding to cooperate, since the vehicle 4.2 recognizes the part 80 of the image pattern safely in any case. In the depiction of FIG. 6*b*), the deceleration of the second vehicle 4.2 is indicated by a speed arrow with two arrow heads pointing in opposite directions after it has recognized the red X 80 of the image pattern 8 in normal driving, as shown in FIG. 6*a*).

In the depiction of FIG. 6*c*), a subsequent step is now depicted in which the second vehicle 4.2 has already calculated at which point it will come to a stop and accordingly projects the image pattern 8 from it onto its lane 1.2. At the same time, the first vehicle 4.1 still projects the red X 80 accordingly. The first vehicle 4.1 now detects the projected zebra crossing as image pattern 8' on the lane 1.2 and recognizes that the second vehicle 4.2 is cooperating accordingly. It switches off the X as a warning and danger sign for the pedestrian 3 and as communication symbol for the further vehicle 4.2 accordingly. If there is no vehicle in the vicinity on the further lane 1.3, the corresponding image patterns 8 of the crosswalks can now be switched—as depicted—to "cross the whole road safely"; otherwise the scenario shown in FIG. 6*d*) is largely similar to that in FIG. 3, wherein the communication here takes place exclusively or in addition to a Car2Car communication via the optical signals. Here, too, the first vehicle 4.1 is active as an initiator and monitors the will of the other vehicle 4.2 to cooperate, such that here too, communication follows the master-slave concept.

Finally, the depiction in FIG. 7 shows a further scenario which substantially corresponds to that in FIG. 6*a*). The second vehicle 4.2 is detected by a rear-facing part of the environment sensor system of the first vehicle 4.1. It approaches the first vehicle 4.1, which has already initiated the crossing for the pedestrian 3, at such a high speed that, despite communication, it cannot be assumed that the vehicle 4.2 will come to a stop next to the vehicle 4.1. In this case, as indicated in the representation of FIG. 7, the red X 80 as a warning sign can be changed accordingly in its graphic representation or coding. By way of example, it changes its size or it flashes in order to reliably warn the pedestrian 3. In addition, or alternatively, writings or pictograms can also be projected here, for example a stop sign or words such as, for example, stop, hazard, danger or similar. In addition to the warning via the, for example, flashing red X 80, the vehicle 4.2 or a driver in this vehicle 4.2 can also be made aware of the potential danger point via a flashing signal from the first vehicle 4.1, for example an activation of the hazard warning lights or similar.

The described method in its embodiment variants functions in particular amongst autonomously driving vehicles. However, it is also possible to include non-autonomously driving vehicles or vehicles that are only partially autonomous by means of corresponding driver assistance systems. By way of example, an autonomous vehicle can be operated as the first vehicle 4.1 in master mode, and the non-autonomous vehicle in slave mode. The non-autonomous vehicle needs either an attentive driver, as in today's traffic, who then cooperates accordingly, and thus effectively stops in slave mode. This can then be detected by the first vehicle 4.1 and its environment sensors. If the non-autonomous vehicle, for example the vehicle 4.2, has assistance systems that can detect the situation via Car2Car or via environment sensing 5, then a corresponding display can also be presented to the driver for assistance in order to prompt him/her to act cooperatively. This is done by the display module 14 optionally indicated in FIG. 5.

In any case, it is the case now that such a non-autonomous vehicle, for example the vehicle 4.2, if it has a pixel light or a laser light, can use it to project the corresponding image pattern 8. This projection must then be manually triggered by the person driving the vehicle 4.2. If he/she is unable to do so, this can be indicated via a feedback communication in the case of Car2Car communication, for example. It can also be detected via the first vehicle 4.1 in the master mode that the further vehicle 4.2 has stopped accordingly, but is not projecting a zebra crossing as image pattern 8. If the projection area of its pixel headlights 7 or its laser light or its laser projection is sufficient, it can then also take over the projection for this non-autonomous vehicle if it has reliably detected via the communication or its environment sensors that this vehicle is stationary.

In the reverse case, where the non-autonomous vehicle is in master mode, an autonomous vehicle, for example the vehicle 4.2 and/or 4.3, can then be informed of the situation in slave mode via the communication, for example via the environmental sensors 5 or a Car2Car communication, and can react to this in the manner already described above, since it is irrelevant for the vehicle in the slave mode whether the vehicle is operated autonomously or non-autonomously in the master mode.

All in all, this results in the possibility of an extraordinarily comfortable and safe crossing of a road 1 with all its lanes 1.1, 1.2, 1.3 for a pedestrian 3.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for visualizing a crossing over a road for a road user wanting to cross the road, the method comprising:
   projecting, by a first vehicle in a first lane, an image pattern onto the road for the road user crossing the road, wherein the first vehicle projects the image pattern while stopped; and
   communicating, by the first vehicle, with at least one further vehicle driving on the road in a further lane by at least indirectly informing the at least one further vehicle about the road user wishing to cross the road and about the projected image pattern;
   requesting the at least one further vehicle to stop and to (1) project an image pattern onto the further lane in addition to the image pattern of the first vehicle or (2) at least indirectly report back to the first vehicle that the at least further vehicle will take over the projection onto the further lane,
   wherein the image pattern comprises at least two graphically different or differently colored states, a first one of the at least two graphically different or differently colored states indicates that the entire road can be crossed safely and a second one of the at least two graphically different or differently colored states indicates that only the lane on which the image pattern is projected can be safely crossed, and
   wherein the first vehicle initially projects the second one of the at least two graphically different or differently colored states while it monitors the implementation of the request to the at least one further vehicle via a feedback communication or an environment sensor system of the first vehicle, and, after the request has been followed or when it is predicted that the request will be followed, the first vehicle projects the first one of the at least two graphically different or differently colored states.

2. The method of claim 1, wherein the communication by the first vehicle uses optical signals of the first vehicle.

3. The method of claim 2, wherein the optical signals are detected and evaluated by an environment sensor system of the at least one further vehicle.

4. The method of claim 1, wherein the communication by the first vehicle uses a vehicle-to-vehicle communication or indirectly via a vehicle-to-X and an X-to-vehicle communication.

5. The method of claim 4, wherein a communication link between the first and at least one further vehicle is terminated, starting from the first vehicle, after the road user wishing to cross the road has crossed the road.

6. The method of claim 1, wherein while the first vehicle projects the second one of the at least two graphically different or differently colored states, the first vehicle also projects a graphical depiction of a blocked area not to be entered in a lane adjacent to the first vehicle.

7. The method of claim 1, wherein the first vehicle, in case of adaptation of the image pattern, informs the at least one further vehicle and in turn requests an analogous adaptation of the image pattern, provided that the first projects its part of the image pattern itself.

8. The method of claim 1, wherein the image pattern is projected as a zebra crossing via pixel headlights or via a laser light or laser projection.

\* \* \* \* \*